(12) United States Patent
Jin et al.

(10) Patent No.: US 12,062,040 B2
(45) Date of Patent: Aug. 13, 2024

(54) METHOD FOR BLOCK CONSENSUS AND METHOD FOR MANAGING TRANSACTION STATE

(71) Applicant: ELECTRONICS AND TELECOMMUNICATIONS RESEARCH INSTITUTE, Daejeon (KR)

(72) Inventors: Heesang Jin, Daejeon (KR); Jintae Oh, Daejeon (KR); Ki Young Kim, Daejeon (KR); Young-Chang Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 281 days.

(21) Appl. No.: 17/566,411

(22) Filed: Dec. 30, 2021

(65) Prior Publication Data
US 2022/0222655 A1  Jul. 14, 2022

(30) Foreign Application Priority Data

Jan. 8, 2021 (KR) .......... 10-2021-0002482

(51) Int. Cl.
*G06Q 20/36* (2012.01)
*G06Q 20/06* (2012.01)
*G06Q 20/38* (2012.01)

(52) U.S. Cl.
CPC ....... *G06Q 20/3674* (2013.01); *G06Q 20/065* (2013.01); *G06Q 20/38215* (2013.01); *G06Q 20/3827* (2013.01); *G06Q 20/389* (2013.01)

(58) Field of Classification Search
CPC ............ G06Q 20/3674; G06Q 20/065; G06Q 20/38215; G06Q 20/3827; G06Q 20/389; H04L 67/1068; H04L 9/3242; H04L 9/50; H04L 67/1087
See application file for complete search history.

(56) References Cited

U.S. PATENT DOCUMENTS

| | | | |
|---|---|---|---|
| 2019/0147438 A1 | 5/2019 | Micali et al. | |
| 2019/0235946 A1* | 8/2019 | Guo | ............... H04L 67/1097 |
| 2019/0327084 A1 | 10/2019 | Oh et al. | |
| 2019/0334697 A1* | 10/2019 | Winslow | ............... H04L 9/3242 |

(Continued)

FOREIGN PATENT DOCUMENTS

| | | | | |
|---|---|---|---|---|
| CN | 106716421 B | | 3/2020 | |
| CN | 111630826 A | * | 9/2020 | ......... G06F 16/2379 |
| KR | 10-2020-0090168 A | | 7/2020 | |

(Continued)

*Primary Examiner* — Mark D Featherstone
*Assistant Examiner* — Kweku William Halm (57) ABSTRACT

A block consensus method of a computing device is provided. The computing device receives a delegate request message including transaction hashes from each of a plurality of nodes, generates a prepared block including transaction hashes based on the delegate request message, and transmits a prepare message including the prepared block to the nodes. The computing device receives a commit message including a proof of consensus on a validity of the prepared block from the nodes, and transmits a reply message including a final block decided based on the commit message.

7 Claims, 11 Drawing Sheets

(56) References Cited

U.S. PATENT DOCUMENTS

2019/0379538 A1  12/2019  Oh et al.
2020/0403776 A1  12/2020  Oh et al.

FOREIGN PATENT DOCUMENTS

| KR | 10-2020-0126061 A | | 11/2020 |
| KR | 20200144466 A | | 12/2020 |
| WO | 2019/231965 A1 | | 12/2019 |
| WO | WO-2021009496 A1 | * | 1/2021 |

* cited by examiner

| TxID | 32 bytes |
|---|---|
| TxType | L bytes |
| SignerPubKey | 33 bytes |
| PayloadHash | 32 bytes |
| Signature | 64 bytes |
| Payload | N bytes |

FIG. 4

| TxID | 32 bytes |
|---|---|
| TxType | L bytes |
| SignerPubKey | 64 bytes |
| PayloadHash | 32 bytes |
| Signature | 64 bytes |

FIG. 5

- Transaction Respondents decision :
- TxMap<CommitteeNodeID, TxIDs>
- TxCounts<CommitteeNodeID, int>
- TxRequenstMap<TxID, boolean>
- # 1. Count the number of transactions for each node
- for nodeID, txIDs each TxMap :
-     for txID each txIDs :
-         if TxMap[MyNodeID].not_contains(txID) :
-             TxCounts [nodeID] += 1

- # 2. Request transactions for each node
- TxCounts.sort_ascending_by_value ()
- while TxRequestMap.values.contains (false) :
-     for nodeID each txCounts.keys :
-         txIDs = TxMap [nodeID]
-         reqTxIDs [] = []
-         k = K
-         for txID each txIDs :
-             if TxMap [MyNodeID].not_contains (txID) &&
                 TxRequestMap [txID] == false && k > 0 :
-                 reqTxIDs.add (txID)
-                 TxRequestMap [txID] == true
-                 k -= 1
-         for txID each reqTxIDs :
-             request_tx (nodeID, txID)

FIG. 6

|  | Node A (Primary) | Node B | Node C | Node D | Node E | Respondent |
|---|---|---|---|---|---|---|
| Tx 1 | 0 | 1 | 1 | 0 | 1 | Node B |
| Tx 2 | 0 | 1 | 1 | 0 | 1 | Node E |
| Tx 3 | 0 | 1 | 1 | 1 | 0 | Node D |
| Tx 4 | 1 | 0 | 1 | 1 | 1 |  |
| Number of owned Tx | 0 | 3 | 3 | 1 | 2 |  |

| TxID | 32 bytes |
| --- | --- |
| TxType | L bytes |
| SignerPubKey | 64 bytes |
| PayloadHash | 32 bytes |
| Signature | 64 bytes |
| ParentTxIDs | M bytes |

METHOD FOR BLOCK CONSENSUS AND METHOD FOR MANAGING TRANSACTION STATE

CROSS-REFERENCE TO RELATED APPLICATION

This application claims priority to and the benefit of Korean Patent Application No. 10-2021-0002482 filed in the Korean Intellectual Property Office on Jan. 8, 2021, the entire contents of which are incorporated herein by reference.

BACKGROUND (a) Field

The described technology relates to a method for block consensus and a method for managing a transaction state.

(b) Description of the Related Art

In distributed consensus algorithms using a Byzantine Fault Tolerance (BFT) protocol, a transaction consented by (2f+1) nodes among (3f+1) congress nodes selected from all nodes is included in a block. Here, f denotes a number of Byzantine nodes.

In Algorand, a representative distributed consensus algorithm using the BFT protocol, committee (or verifier) nodes are selected for each round by using a verifiable random function (VRF), and the committee nodes performs a consensus process by exchanging prepared blocks. However, since most of the prepared block is occupied by the transaction, the size of the prepared block increases as the number of transactions or the size of the transaction increases, which degrades performance of block consensus.

Therefore, even if the size of the transaction increases or the number of transactions increases during the consensus process, there is a need for a method to reduce the effect on the performance of block consensus.

SUMMARY

Some embodiments may provide a method for block consensus and a method for managing a transaction state that can reduce a size of a message exchanged between nodes.

According to an embodiment, a block consensus method of a computing device is provided. The block consensus method includes receiving a delegate request message including transaction hashes from each of a plurality of nodes, generating a prepared block including transaction hashes based on the delegate request message, transmitting a prepare message including the prepared block to the nodes, receiving a commit message including a proof of consensus on a validity of the prepared block from the nodes, and transmitting a reply message including a final block decided based on the commit message.

In some embodiments, the delegate request message may not include original transactions corresponding to the transaction hashes included in the delegate request message, and the prepare message may not include original transactions corresponding to the transaction hashes included in the prepare message.

In some embodiments, the transaction hashes included in the delegate request message received from each of the nodes may include a transaction hash of a transaction that a corresponding node wants to append to the prepared block.

In some embodiments, generating the prepared block may include generating the prepared block including the transaction hashes consented by a predetermined number of nodes among the nodes based on the transaction hashes included in the delegate request message.

In some embodiments, when a number of the nodes is (2f+1), the predetermined number may be (f+1).

In some embodiments, transmitting the prepare message may include selecting a node to request an original transaction corresponding to each of the transaction hashes included in the prepared block from among the nodes, and requesting the original transaction from the selected node.

In some embodiments, transmitting the prepare message may further include calculating a number of transactions owned by each of the nodes. In this case, selecting the node may include selecting the node to request the original transaction sequentially from a node having a smallest number of owned transactions.

In some embodiments, requesting the original transaction may include requesting K original transactions from the selected node, and K may be an integer greater than or equal to one.

In some embodiments, the original transaction requested to different nodes may not be duplicated.

In some embodiments, receiving the commit message may include receiving, from each of the nodes, an original transaction corresponding to a transaction hash requested to a corresponding node among the transaction hashes included in the prepared block.

In some embodiments, transmitting the reply message may include transmitting information indicating which node among the nodes has transmitted a transaction hash of which transaction through the delegate request message.

According to another embodiment of the present invention, a method of managing a transaction state of a computing device in distributed consensus is provided. The method includes receiving a block including a hash of a first transaction, setting a state of the first transaction to a hash-only state in response to the first transaction not existing in a memory pool, and changing the state of the first transaction from the hash-only state to a ready state in which execution of the first transaction is ready in response to an original transaction of the first transaction being requested and received.

In some embodiments, the method may further include executing the first transaction in the ready state, and changing the state of the first transaction from the ready state to a spent state in response to executing the first transaction.

In some embodiments, the method may further include checking whether parent transactions of the second transaction have been executed before executing a second transaction.

In some embodiments, the method may further include executing the second transaction in response to all of the parent transactions of the second transaction having been executed.

In some embodiments, the method may further include, in response to at least a part of the parent transactions having not been executed, checking states of the parent transactions which have not been executed.

In some embodiments, the method may further include, in response to a parent transaction in the ready state existing among the parent transactions which have not been executed, waiting for execution of the parent transaction in the ready state.

In some embodiments, the method may further include, in response to a parent transaction in the hash-only state existing among the parent transactions which have not been executed, requesting an original transaction of the parent transaction in the hash-only state.

In some embodiments, the method may further include, in response to a parent transaction in a waiting state existing among the parent transactions which have not been executed, waiting until the parent transaction in the waiting state is appended to a block to be consented According to yet another embodiment, a computing device including a memory configured to store one or more instructions and a processor configured to execute the one or more instructions. By executing the one or more instructions, the processor may receive a delegate request message including transaction hashes from each of a plurality of nodes, generate a prepared block including transaction hashes based on the delegate request message, transmit a prepare message including the prepared block to the nodes, receive a commit message including a proof of consensus on a validity of the prepared block from the nodes, and transmit a reply message including a final block decided based on the commit message.

According to some embodiments, since block consensus is performed by using a fixed and very small transaction hash instead of a variable and large transaction, the size of a consensus message exchanged between nodes can be reduced.

DETAILED DESCRIPTION OF THE EMBODIMENTS

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

As used herein, the singular forms "a", "an" and "the" are intended to include the plural forms as well, unless the context clearly indicates otherwise.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

Figure 1:
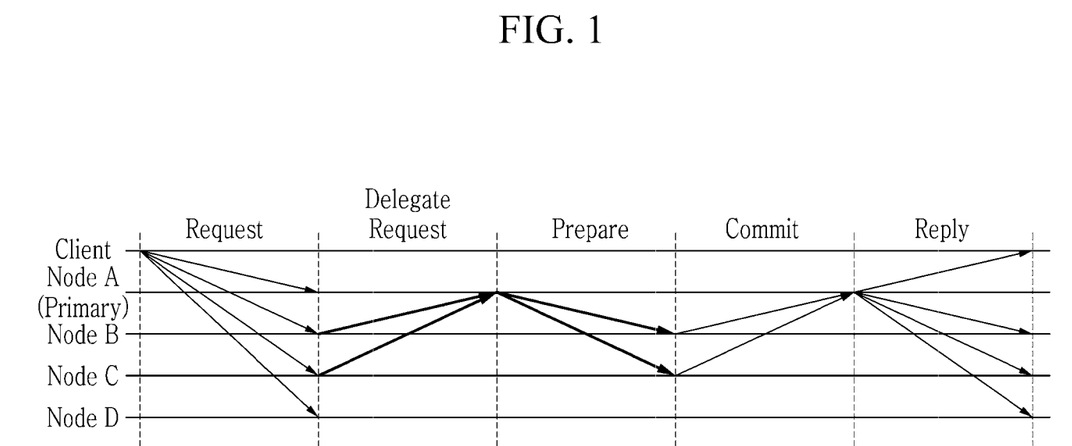
FIG. 1 is a diagram showing an example of a block consensus method according to an embodiment.

FIG. 1 is a diagram showing an example of a block consensus method according to an embodiment. For convenience of description, only one client and four nodes are shown in FIG. 1. In FIG. 1, an arrow indicates transfer of a message. In some embodiments, each node may include a computing device.

Referring to FIG. 1, the client broadcasts a request message to all nodes (participating nodes) of a blockchain that can participate in consensus. (3f+1) congress nodes, which have obtained a qualification to participate in the consensus among the participating nodes, perform a four-phase block consensus process, including delegate request, prepare, commit phases, and reply, to consent to a transaction to be appended to a block, and broadcast a final block (replied block or committed block) to the client and all nodes. The detailed block consensus process is as follows.

Each participating node verifies a validity of a transaction received from the client and stores the verified transaction in its own memory pool (mempool). When the participating node is a congress node (e.g., any of four (=3f+1) nodes Node A, Node B, Node C, and Node D in a case of f=1), the participating node retrieves a predetermined number of transactions to be appended to a next block from the memory pool and transmits a delegate request message including the transactions to a primary node (e.g., Node A). In this case, the primary node may transmit the delegate request message to itself or process the delegate request message locally. The delegate request message may further include a signature of the participating node.

In one embodiment, the primary node may select a transaction which is consented by (f+1) nodes among transactions included in (2f+1) delegate request messages which have been first arrived, i.e., the delegate request messages arrived from (2f+1) nodes (e.g., Node A, Node B, and Node C), and generate a prepared block with the selected transaction. In another embodiment, the primary node may select a transaction which is consented by (f+1) nodes among transactions included in (2f+1) delegate request messages, which have a high priority according to a predetermined criterion among the delegate request messages which have been arrived during a predetermined period of time, and generate a prepared block with the selected transaction. The predetermined criterion may include, for example, a criterion according to a stake or a hash value. Further, the primary node may generate a proof indicating which transaction has consented by which node (i.e., which transaction has submitted by which node) and transmit a prepare message including the prepared block and the proof to the (2f+1) nodes (e.g., Node A, Node B, Node C) selected among the nodes having transmitted the delegate request message. Here, the (2f+1) nodes are called committee nodes. In some embodiments, the proof may be a bitmap (referred to as a "transaction bitmap") having an identifier (ID) of a committee node having submitted the transaction as a key and an ID of the transaction transmitted by the committee node as a value. The delegate request message may further include a signature of the primary node.

Upon consenting to the prepared block, each committee node (e.g., Node A, Node B, or Node C) verifies a validity of the prepared block, and transmits a commit message, including a signature as a proof of consensus, to the primary node. Since the primary node already owns all the transactions included in the prepared block, the commit message transmitted by each committee node includes no transaction. Finally, when all the (2f+1) committee nodes consent to the prepared block, the primary node decides a final block, and transmits a reply message including the final block to all nodes in the blockchain and to the client which have requested the transaction. The reply message may further include a signature of the primary node.

In the embodiments described with reference to FIG. 1, the delegate request message and the prepare message including original transactions are transmitted in the delegate request and prepare phases. Accordingly, as the size of the transaction increases, a load according to an amount of transmitted messages may increase. Hereinafter, embodiments for reducing the amount of transmitted messages are described.

Figure 2:
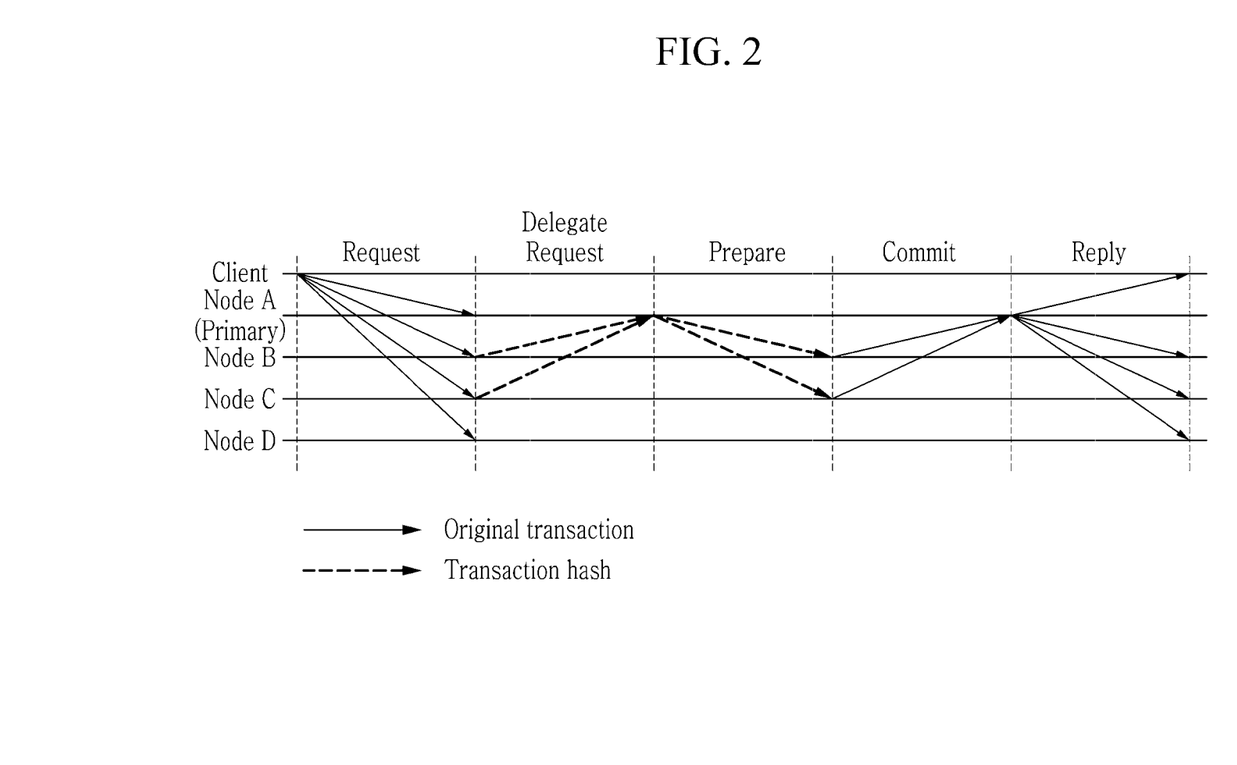
FIG. 2 is a diagram showing an example of a block consensus method according to another embodiment.

FIG. 2 is a diagram showing an example of a block consensus method according to another embodiment. For convenience of description, only one client and four nodes are shown in FIG. 2. In FIG. 2, an arrow indicates transfer of a message.

Referring to FIG. 2, in a request phase, the client broadcasts a request message to all nodes (participating nodes) in a blockchain that can participate in consensus. Similar to embodiments described with reference to FIG. 1, (3f+1) congress nodes, which have obtained a qualification to participate in block consensus among participating nodes, performs a four-phase consensus process including delegate request, prepare, commit, and reply phases. Here, f is a natural number.

In the delegate request phase, each participating node verifies a validity of a transaction received from the client through the request message and stores the verified transaction in its own memory pool. The congress nodes (e.g., Node A, Node B, Node C, and Node D) proposes a transaction to be appended to a block to be consented to a primary node (e.g., Node A) through a delegate request message. In this case, the congress node retrieves a predetermined number of transactions to be appended to a next block (prepared block) from the memory pool, hashes the transactions, and transmits a delegate request message including transaction hashes to the primary node. The delegate request message may further include a signature of the congress node. In some embodiments, the congress node may hash the transaction by inputting the transaction into a hash function to generate fixed-size data. In this case, the transaction hash corresponds to the fixed-size data.

In the prepare phase, the primary node retrieves a transaction hash which is consented by (f+1) nodes among transaction hashes included in the delegate request messages received from (2f+1) nodes, i.e., committee node (e.g., Node A, Node B, and Node C), and generates a prepared block with the retrieved transaction hash. That is, the prepared block includes the transaction hash consented by the (f+1) nodes. When generating the prepared block, the primary node does not look at content of the transaction, but determines whether (f+1) nodes have consented to a specific transaction, so the primary node can generate the prepared block using the transaction hash not the original transaction. In some embodiments, the delegate request messages received from (2f+1) committee nodes may be (2f+1) delegate request messages that have been first arrived among the delegate request messages transmitted from (3f+1) congress nodes. In some embodiments, the delegate request messages received from (2f+1) committee nodes may be (2f+1) delegate request messages that have a high priority according to a predetermined criterion among the delegate request messages which have been arrived from (3f+1) congress nodes during a predetermined period of time. Next, the primary node transmits a prepare message including the prepared block having the transaction hash to the (2f+1) committee nodes (e.g., Node A, Node B, and Node C). In this example, the (2f+1) committee nodes are the nodes that have first transmitted the delegate request messages to the primary node. Further, the primary node may generate a proof indicating which transaction has consented by which node (i.e., which transaction has submitted by which node) and transmit the prepare message including the prepared block and the proof. In some embodiments, the proof may be a transaction bitmap having an ID of a committee node having submitted the transaction as a key and an ID of the transaction hash transmitted by the committee node as a value. Furthermore, the primary node may transmit an original transaction request message to the committee nodes in order to obtain an original transaction that the primary node does not own among transactions corresponding to the transaction hashes included in the prepared block. In some embodiments, the primary node may not request all the transactions owned by each committee node, but may designate a transaction to be received from each committee node and request the designated transaction from the corresponding committee node, thereby preventing the committee nodes from repeatedly transmitting the original transaction. As such, when transmitting the prepare message to each committee node, the primary node may transmit the original transaction request as well as the prepared block and the proof (transaction bitmap). In addition, the prepare message may further include a signature of the primary node.

Next, in the commit phase, each committee node (e.g., Node A, Node B, or Node C) verifies a validity of the received prepared block, and transmits a commit message, including a signature as a proof of consensus, to the primary node when consenting to the prepared block. In this case, each committee node may transmit a requested original transaction (e.g., a transaction designated by the transaction bitmap), among the transactions corresponding to the transaction hashes included in the prepared block, to the primary node through the commit message.

Finally, in the reply phase, when all the (2f+1) committee nodes consent to the prepared block, the primary node decides a final block, and transmits a reply message including the final block to all nodes in the blockchain and to the client which have requested the transaction.

According to the above-described embodiments, the transaction hash, not the original transaction, can be transmitted in the delegate request and prepare phases. Accordingly, even if the size of the transaction increases, hash data always having the same size can be transmitted, so that the size of the message for consensus can be significantly reduced.

Figure 3:
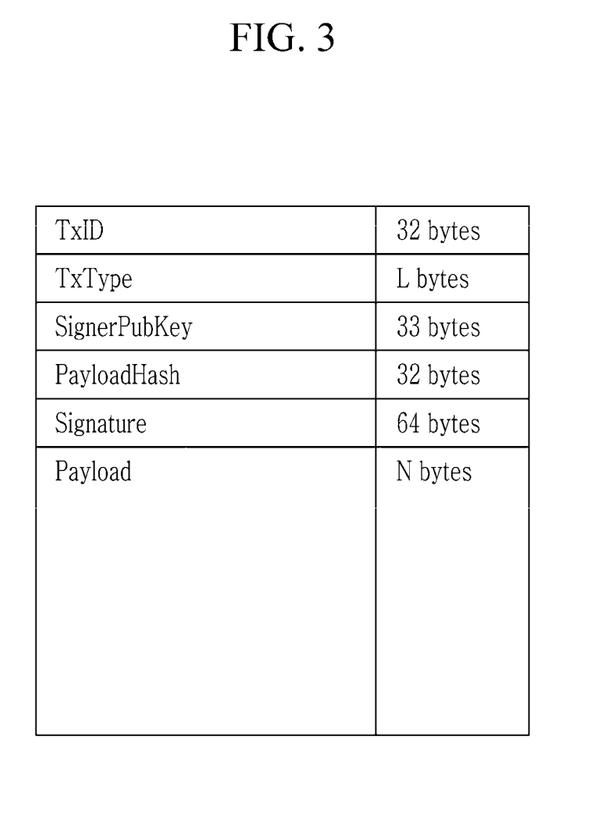
FIG. 3 is a diagram showing an example of a data structure including an original transaction.
Figure 4:
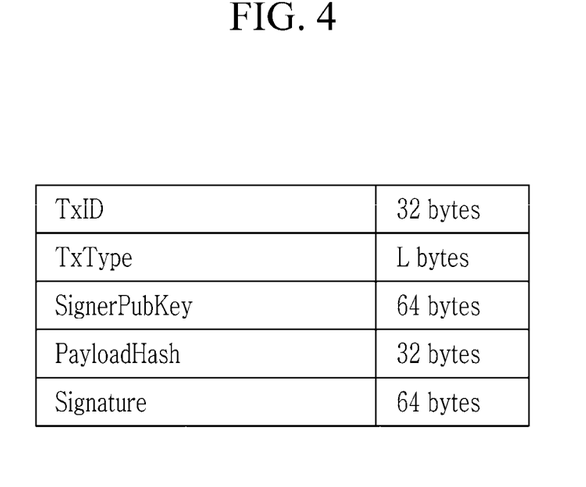
FIG. 4 is a diagram showing an example of a transaction hash data structure according to another embodiment.

FIG. 3 is a diagram showing an example of a data structure including an original transaction, and FIG. 4 is a diagram showing an example of a transaction hash data structure according to another embodiment.

As shown in FIG. 3, a message used in an embodiment described with reference to FIG. 1 may use a data structure including an original transaction (payload) (hereinafter referred to as "original transaction data structure"). Alternatively, as shown in FIG. 4, a message used in an embodiment described with reference to FIG. 2 may use a data structure in which the original transaction is removed (hereinafter referred to as a "transaction hash data structure").

As shown in FIG. 3 and FIG. 4, in some embodiments, in the transaction hash data structure, a transaction header, such as a transmit node identifier (TxID), a signer's public key (SignerPubKey), a transaction hash (PayloadHash), and a signature, of the original transaction data structure is maintained, but a body corresponding to the original transaction, i.e., a payload may be removed.

In the embodiment described with reference to FIG. 1, even if the primary node already has a specific transaction, the congress nodes do not know the fact, so they transmit their own transactions to the primary node. Further, since each congress node does not know which transactions other congress nodes will submit to the primary node, up to (3f+1) identical original transactions may be repeatedly transmitted. On the other hand, in the embodiment described with reference to FIG. 2, the primary node, that has identified transactions which each node owns from the delegate request message, may request an original transaction to be obtained by designating the original transaction to a specific node. Hereinafter, such a process is referred to as a "transaction respondent decision" process. As such, since the primary node requests only the original transaction to be obtained by designating the specific node, transactions owned by the primary node are not transmitted, and the original transactions are not transmitted repeatedly from different nodes. Thus, compared with the embodiment described in FIG. 1, although the transaction is transmitted to the primary node in the commit phase, the transactions that the primary node does not own are not transmitted repeatedly, and the transactions are not transmitted in the delegate request and prepare phases, so an amount of transmitted messages can be greatly reduced.

Figure 5:
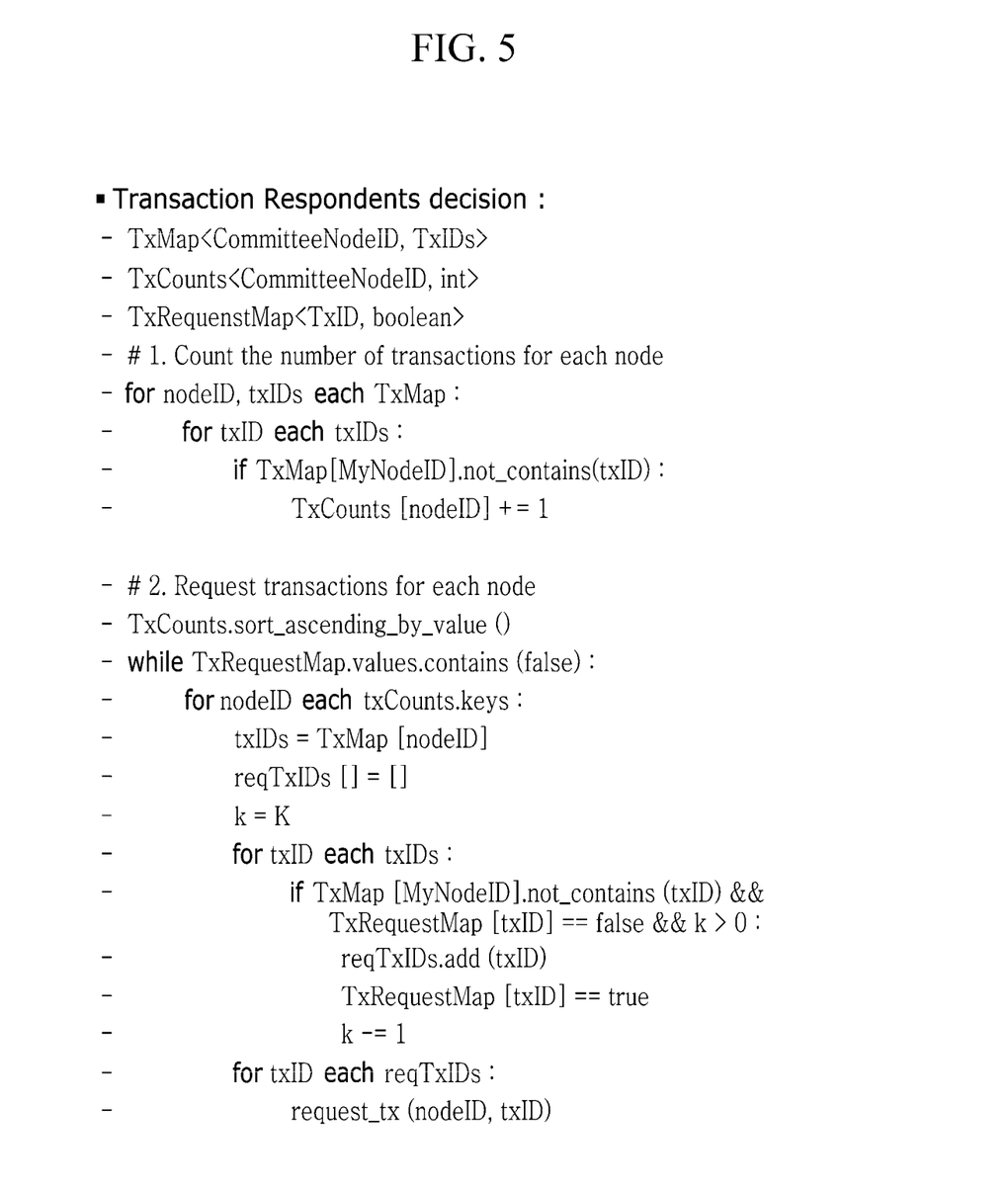
FIG. 5 is a diagram for explaining an example of a transaction respondent decision process in a block consensus method according to yet another embodiment.

FIG. 5 is a diagram for explaining an example of a transaction respondent decision process in a block consensus method according to yet another embodiment.

Referring to FIG. 5, in order to select a transaction respondent, TxMap indicating a transaction bitmap, TxCounts indicating the number of transaction hashes, and TxRequestMap indicating whether a transaction has been requested may be defined. For example, TxMap may have an ID (CommitteeNodeID) of a committee node that has submitted a transaction as a key, and IDs (TxIDs) of the transaction hashes transmitted by the corresponding committee node as values. Accordingly, TxMap may indicate which node has transmitted which transaction hash. TxCounts has an ID (CommitteeNodeID) of a committee node that has transmitted a transaction hash as a key, and an integer value (int) corresponding to the number of transaction hashes transmitted by the corresponding committee node as a value. Accordingly, TxCounts may indicate the number of transaction hashes which have been transmitted by each committee node among transaction hashes included in a prepared block. In some embodiments, TxCounts may indicate the number of transactions that each committee node owns, excluding transactions that the primary node already owns. TxRequestMap may indicate whether each transaction has been requested, for transactions that are included in the prepared block but are not owned by the primary node. TxRequestMap may have an ID of a transaction hash as a key and Boolean as a value. For example, for each transaction hash ID, TxRequestMap may have true when the corresponding transaction has already been requested, and may have false when it has not yet been requested. In this way, the TxRequestMap can prevent a duplicate request for a specific node by indicating the transaction that has been already requested.

In some embodiments, the transaction respondent decision process may be divided into a process of counting the number of transactions for each node and a process of requesting a transaction for each node.

The process of counting the number of transactions for each node is a process of calculating the number of transactions that each committee node owns among transactions included in a prepared block. In some embodiments, the primary node may use TxMap to calculate the number of transactions (TxCounts) that each node owns. Since there is no need to request transactions that the primary node already owns, the number of transactions may be counted by excluding the transactions that the primary node already owns. For example, as shown in FIG. 5, the primary node may calculate the number of transactions (TxCounts[nodeID]) for each node (nodeID). The primary node may determine whether an ID (txID) of each transaction hash of a target node (nodeID) is contained in its own TxMAP (TxMap[MyNodeID]), as in TxMap[MyNodeID].not_contains(txID), and increase the number of transactions (TxCounts[nodeID]) of the target node by one if the ID (txID) is not contained in TxMAP (TxMap[MyNodeID]). Through this process, the primary node can count the number of transactions for each node.

The process of requesting the transaction for each node is a process of requesting an original transaction from a node that own the transaction. In some embodiments, the primary node may request original transactions in ascending order from a node having the smallest number of transactions based on TxCounts. In this way, by requesting the transactions from multiple nodes, traffic for transaction transmission can be distributed to the multiple nodes without being directed to a specific node. In some embodiments, the maximum number of transactions K to be requested from each node at a time may vary depending on the implementation. In one embodiment, one transaction is first requested per node, and then a process of selecting nodes for requesting transactions that have not been requested again may be repeated (i.e., K=1). Although such a method is effective in distributing the traffic for transaction transmission, a relatively large amount of time may be delayed in the process of selecting nodes for requesting the transactions. In another embodiments, there may be no limitation on the number of transactions to be requested from each node (i.e., K=infinity). Since such a method requests all transactions that each node owns from the corresponding node, the effect of distributing the traffic may be lower than the method in which K is set to one. However, the traffic can be distributed because the transactions are requested in ascending order from a node having the smallest number of transactions. Further, in some embodiments, each transaction may be requested from a plurality of nodes (P nodes) in consideration of a network failure situation, and the P and K values may vary depending on the system environment and implementation.

For example, when P is set to one and K is set to an integer value greater than or equal to one, as shown in FIG. 5, the primary node may first sort nodes sequentially (in ascending order) from a node having the smallest number of transactions, as in TxCounts.sort_ascending_by_value( ). Next, while an unrequested transaction exists as in TxRequest- Map.values.contains(false), the primary node may repeat a process of requesting transactions sequentially from the node (nodeID) having the smallest number of transactions (TxCounts). First, the primary node may set IDs of the transaction hashes which the target node (nodeID) owns, as in "txIDs=TxMap[nodeID]", and initialize a transaction hash ID list (reqTxIDs) of transactions to request, as in "reqTxIDs[ ]=[ ]". Next, the primary node may select K transaction hashes to request from the target node. To this end, if there is an ID (txID) of a transaction hash which the primary node does not own (TxMap[MyNodeID].not_contains(txID)) and has not yet requested (TxRequestMap[txID]==false), the primary node may add the ID (txID) to the list of transactions to request as in reqTxIDs.add(txID). Accordingly, the primary node may set the ID of the corresponding transaction hash to the requested transaction, as in "TxRequestMap[txID]=true". If a certain transaction hash is already owned by the primary node as in "TxMap[MyNodeID].not_contains(txID)==false" or has already been requested as in "TxRequestMap[txID]==true", an ID (txID) of the certain transaction hash is not added the list of transactions to request (reqTxIDs). The primary node may repeat this process until it adds the IDs of K transaction hashes to the lists of transactions to request for one node. Once K transactions to request from one node is selected, K transactions to request from a next node are selected. This process is repeated for all nodes (for nodeID each txCounts.keys). Thereafter, the primary node repeats the above-described process again for transactions that have not yet been requested as in "while TxRequestMap.values.contains(false):". Once nodes to request are selected for all the transactions, the primary node may request transactions from each target node as in request_tx(nodeID, txID).

Figure 6:
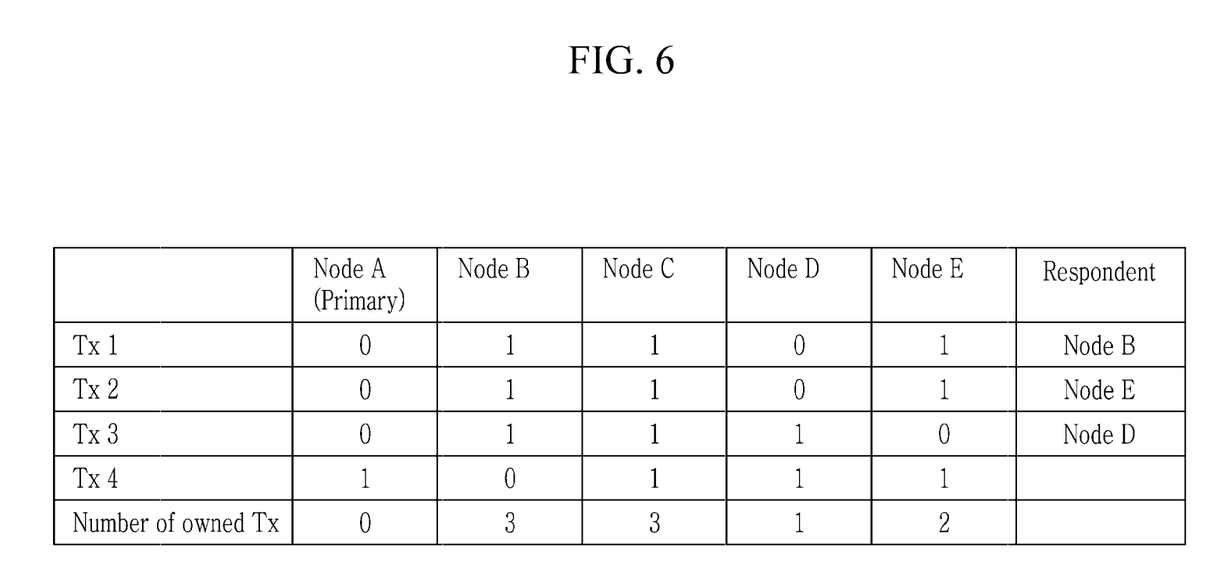
FIG. 6 is a diagram showing an example of a transaction respondent decision process in a block consensus method according to another embodiment.

FIG. 6 is a diagram showing an example of a transaction respondent decision process in a block consensus method according to another embodiment.

It is shown in FIG. 6 that a transaction owned by each of committee nodes (for example, five (=2f+1) nodes Node_A, Node_B, Node_C, Node_D, and Node_E in a case of f=2) is denoted as '1' and a transaction not owned by each of five committee nodes is denoted as '0'. The primary node Node_A needs all four transactions requested by three (=f+1) or more nodes to generate a final block in a reply phase. However, since the primary node Node_A does not own three transactions Tx1, Tx2, and Tx3, it may request the three transactions Tx1, Tx2, and Tx3 from the other nodes Node_B, Node_C, Node_D, and Node_E. In this case, the primary node Node_A may determine which node to request each transaction from according to a transaction respondent decision process. First, the primary node Node_A may calculate the number of transactions (TxCounts) owned by each node in a process of counting the number of transactions for each node. When calculating the number of owned transactions (TxCounts), the primary node Node_A may exclude the transaction Tx4 since the primary node already owns the transaction Tx4. Therefore, the number of transactions (TxCounts), except for the transaction Tx4, owned by the other nodes Node_B, Node_C, Node_D, and Node_E are three, three, one, and two, respectively. Next, the primary node Node_A may request transactions in the order of the smallest number of owned transactions (TxCounts) in a process of requesting a transaction for each node. Accordingly, the primary node Node_A may first request the transaction Tx3 from the node Node_D, request the transaction Tx2 from the node Node_E, and then request the transaction Tx1 from the node Node_B. In some embodiments, the primary node may request the transaction Tx1 from the node Node_C having the same number of owned transactions as the node Node_B.

In this way, the primary node can send a transaction request message to each committee node by including the transaction request message in a prepare message. Thereafter, the committee node transmits a commit message to the primary node along with the requested original transaction. Finally, the primary node that has received the commit message from (2f+1) committee nodes may decide the final block including the transactions, and broadcast the block through a reply message.

The block consensus method described with reference to FIG. 2 to FIG. 6 may be referred to as an "original transaction-based block consensus method".

Figure 7:
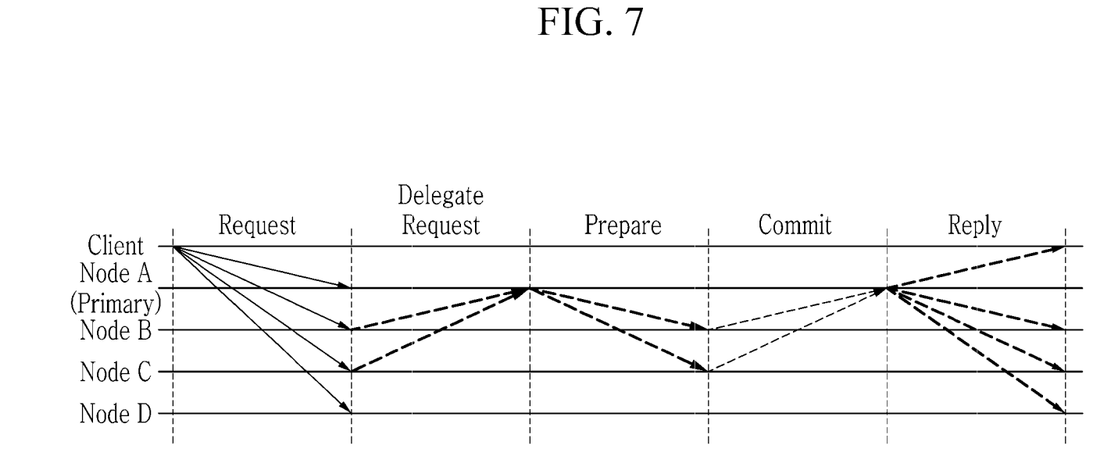
FIG. 7 is a diagram showing an example of a transaction hash-based block consensus method according to yet another embodiment.

FIG. 7 is a diagram showing an example of a transaction hash-based block consensus method according to yet another embodiment. For convenience of description, only one client and four nodes are shown in FIG. 7. In FIG. 7, an arrow indicates transfer of a message.

Referring to FIG. 7, a request phase and a delegate request phase are the same as those of an original transaction-based block consensus method described with reference to FIG. 2, and thus descriptions thereof is omitted.

In a prepare phase, similar to the original transaction-based block consensus method, a primary node (e.g., Node A) retrieves transaction hashes consented by (f+1) nodes from among transaction hashes included in a delegate request message received from (2f+1) nodes (e.g., Node A, Node B, and Node C), and generates a prepare block based on the transaction hashes consented by (f+1) nodes. Further, the primary node transmits a prepare message including the prepared block to the (2f+1) committee nodes. Further, the primary node may generate a proof indicating which transaction has consented by which node (i.e., which transaction has submitted by which node) and transmit the prepare message including the prepared block and the proof. On the other hand, unlike the original transaction-based block consensus method, in the prepare phase, the primary node does not request an original transaction from a committee node.

In a commit phase, each committee node (e.g., Node A, Node B, or Node C) transmits to the primary node a commit message including a signature indicating whether to consent to the prepared block submitted by the primary node. In this case, unlike the original transaction-based block consensus method, the commit message does not include the original transaction. A final block finally decided in a reply phase is broadcasted to the client that has requested the transaction and the nodes existing in a blockchain. In this case, the final block may include a hash of the consented transaction without including the original transaction.

According to the above-described embodiments, it is possible to reduce network traffic by remarkably reducing a size of a block to be transmitted, resulting in improvement in the performance of block consensus.

On the other hand, in the reply phase, the primary node may transmit information (e.g., transaction bitmap) indicating which committee node has transmitted a transaction hash of which transaction through the delegate request message as a reply message. Therefore, a node receiving the reply message may select the committee node from which the original transaction corresponding to the final block is to be received based on the transaction bitmap.

As such, since the final block does not include the original transaction, each node receiving the final block cannot execute the transaction of the final block if it does not own the original transaction in advance. Therefore, in some embodiments, in the transaction hash-based block consensus method, requirements related to i) request/return of an original transaction for executing a transaction included in a block and management of a transaction state, or ii) a dependency between a transaction that has not been executed for the lack of the original transaction and a transaction to be appended to a next block may be considered. Embodiments taking these requirements into consideration are described with reference to FIG. 8 to FIG. 10.

Figure 8:
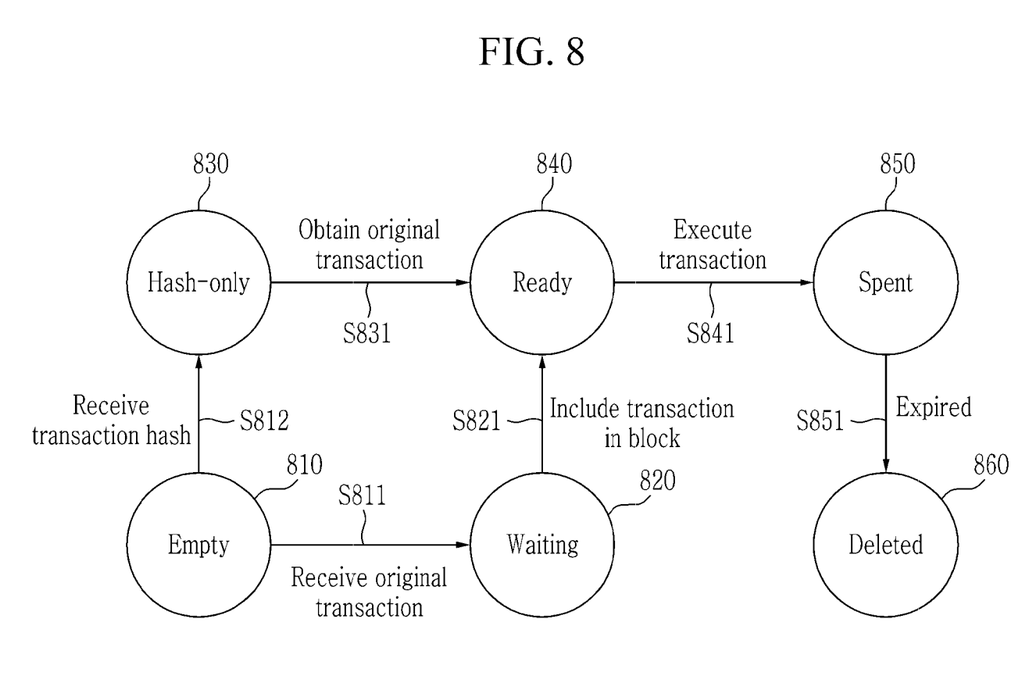
FIG. 8 is a diagram showing an example of a transaction state machine diagram in a block consensus method according to yet another embodiment.

FIG. 8 is a diagram showing an example of a transaction state machine diagram in a block consensus method according to yet another embodiment. The diagram shown in FIG. 8 shows a state change of a transaction stored in a memory pool.

Referring to FIG. 8, an initial state in which a transaction does not exist in the memory pool may be expressed as an empty state 810. A transaction in the empty state 810 may change to a ready state 840 in which transaction execution is ready in two ways. A first method is to go through a waiting state 820. When a node receives a request message including a transaction from a client or another node, the transaction is stored in the memory pool in the waiting state 820 (S811). At this time, since the node has received the original transaction, if the transaction is appended to a block through block consensus, the transaction is ready for execution and changes to the ready state 840 (S821). The first method represents a situation in which the node already owns the original transaction included in the block before the block consensus. A second method is to go through a hash-only state 830. The second method represents a situation in which, upon receiving the consented block, a node does not own an original transaction corresponding to a transaction hash included in the block. Since the node receives only the hash of the consented transaction in a situation where the transaction is not stored in the memory pool, only the transaction hash is stored in the memory pool as the hash-only state 830 (S812). Once the node requests the original transaction from another node and then receives the original transaction (for example, a method described with reference to FIG. 6 may be used), the transaction changes from the hash-only state 830 to the ready state 840 (S831). As described with reference to FIG. 5, each node may select a node from which to receive the original transaction through a transaction respondent decision process. In these two methods, when the transaction is in the ready state 840, the transaction may be executed.

If the node executes the transaction, the transaction changes to a spent state 850 (S841). The spent state 850 is a transaction state to, when an already-executed transaction is transmitted to the node again, prevent duplicate execution of the transaction. If the same transaction as the transmitted transaction exists in the spent state in the memory pool, the transaction may be ignored even if a transaction request comes. Finally, when sufficient time elapses so that the duplicate transaction is not transmitted, the corresponding transaction is deleted from the memory pool and changes to a deleted state 860 (S851). If the duplicate transaction is transmitted again by a malicious node after the transaction is deleted from the memory pool, the transaction is judged as an invalid transaction through a transaction state database, so no problem occurs.

On the other hand, in the transaction hash-based block consensus method, the dependency problem between transactions may occur when each node submits to a primary node a transaction that it wants to append to a block in a delegate request phase. Because the decided block does not have the original transaction (the contents of the transaction), it may not be aware of whether the transaction of the block and the transaction to be appended in the delegate request message have a dependency relationship. Accordingly, in some embodiments, in the transaction hash-based block consensus method, data representing the transaction dependency may be added to the transaction data.

Figure 9:
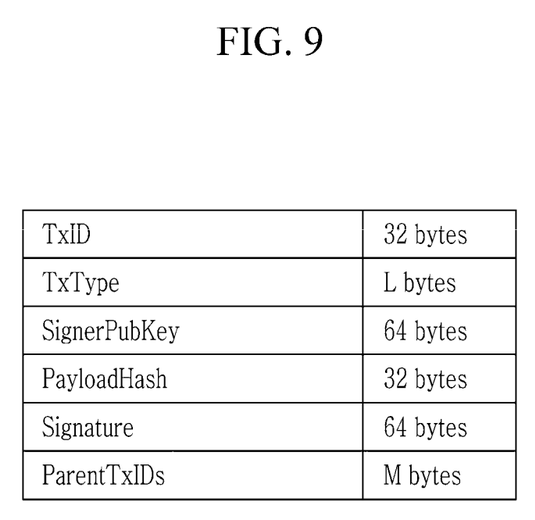
FIG. 9 is a diagram showing an example of a transaction hash data structure according to yet another embodiment.

FIG. 9 is a diagram showing an example of a transaction hash data structure according to yet another embodiment.

As shown in FIG. 9, dependency data (ParentTxIDs) may be added to a transaction hash data structure described with reference to FIG. 4. That is, the dependency data (ParentTxIDs) may be added instead of original data (Payload) in a data structure described with reference to FIG. 3. The size (M bytes) of the dependency data (ParentTxIDs) is relatively very small compared to the size (N bytes) of the original data (Payload). In some embodiments, the dependency data (ParentTxIDs) may include an ID of a parent transaction of the corresponding transaction.

Figure 10:
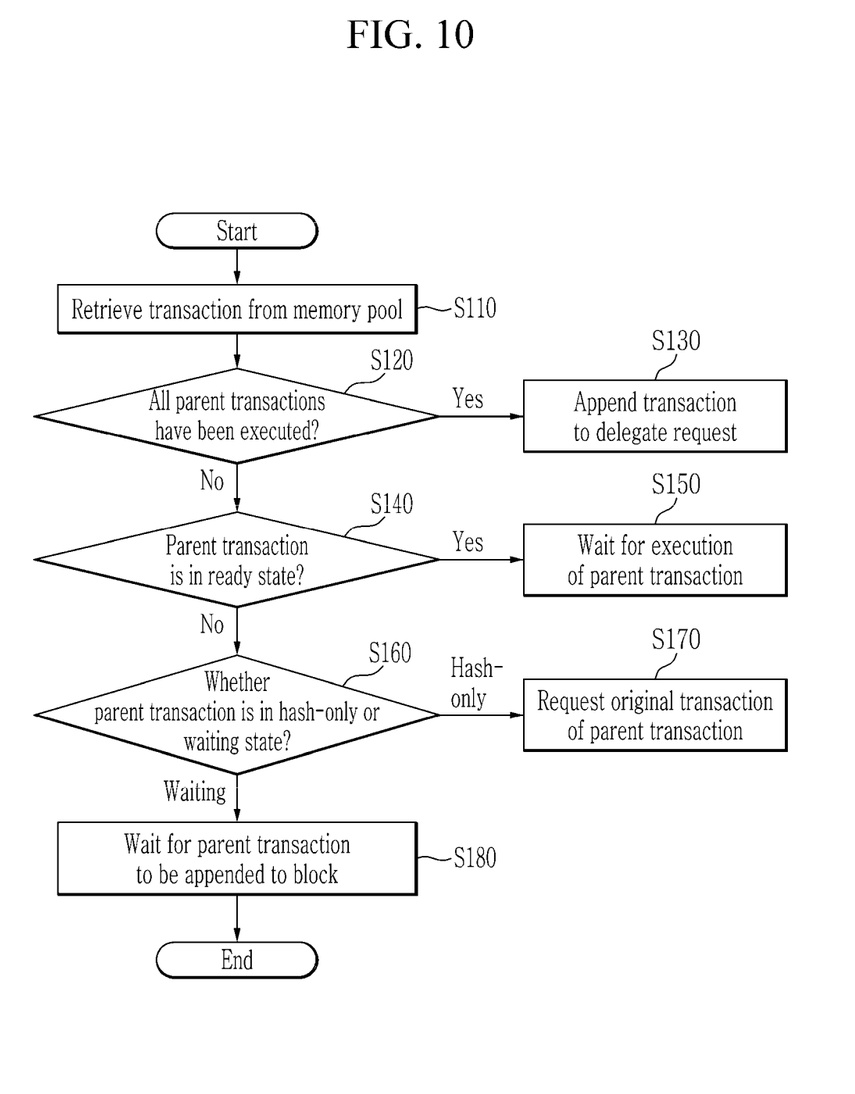
FIG. 10 is a flowchart showing an example of a method for obtaining a transaction from a memory pool in a block consensus method according to yet another embodiment.

FIG. 10 is a flowchart showing an example of a method for obtaining a transaction from a memory pool in a block consensus method according to yet another embodiment.

Referring to FIG. 10, a node first retrieves a transaction from a memory pool (S110), and checks whether all parent transactions of the retrieved transaction have been executed (S120). If all the parent transactions have been executed, the corresponding transaction is appended to a delegate request message because there is no dependency problem (S130). When some or all of the parent transactions have not yet been executed, the node checks states of the parent transactions that have not been executed (S140). When a certain parent transaction stays in a ready state (S140), the node waits until execution of the certain parent transaction is completed (S150). When a certain parent transaction stays in a hash-only state (S160), the node requests an original transaction of the certain parent transaction as described with reference to FIG. 9 (S170). When a certain parent transaction stays in a waiting state, the node waits until the certain parent transaction is appended to a block (e.g., a block to be consented) (S180).

According to the above-described embodiments, requirements related to request/return of an original transaction for executing a transaction included in a block and management of a transaction state, or ii) a dependency between a transaction that has not been executed for the lack of the original transaction and a transaction to be appended to a next block can be addressed.

The block consensus method described with reference to FIG. 7 to FIG. 10 may be referred to as a "transaction hash-based block consensus method".

Next, an example computing device for implementing a block consensus method according to embodiments is described with reference to FIG. 11.

Figure 11:
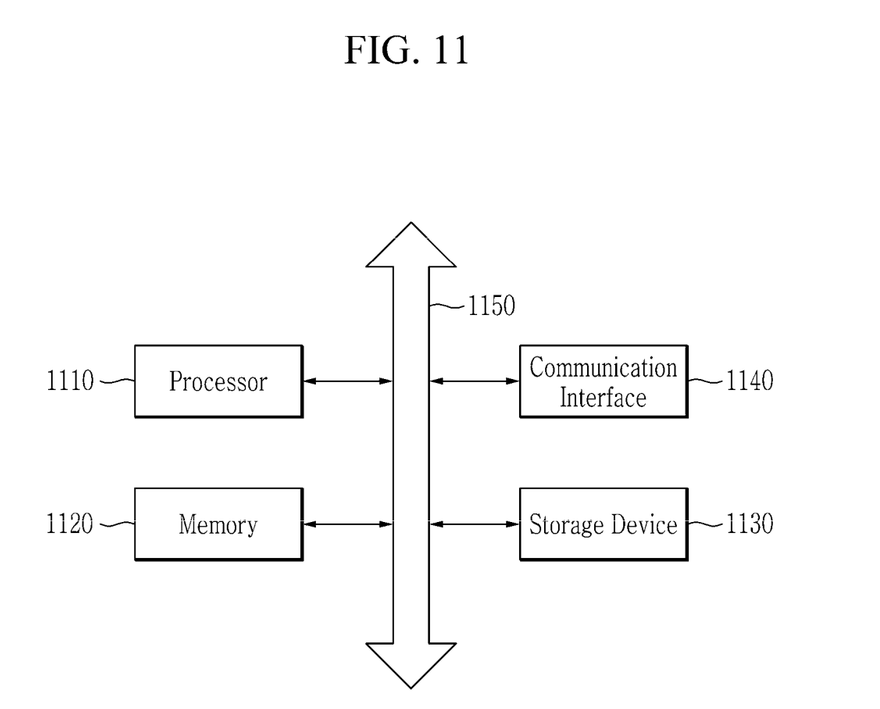
FIG. 11 is a diagram showing an example of a computing device according to an embodiment.

FIG. 11 is a diagram showing an example of a computing device according to an embodiment. In some embodiments, a computing device shown in FIG. 11 may implement operations to be executed by a primary node in a block consensus method according to various embodiments.

Referring to FIG. 11, a computing device includes a processor 1110, a memory 1120, a storage device 1130, a communication interface 1140, and a bus 1150. The computing device may further include other general components.

The processor 1110 controls an overall operation of each component of the computing device. The processor 1110 may be implemented with at least one of various processing units such as a central processing unit (CPU), a microprocessor unit (MPU), a micro controller unit (MCU), and a graphic processing unit (GPU), or may be implemented with a parallel processing unit. Further, the processor 1110 may perform operations on a program for executing the block agreement method described above.

The memory 1120 stores various data, commands, and/or information. The memory 1120 may load a computer program from the storage device 1130 to execute the block agreement method described above. The storage device 1130 may non-temporarily store a program. The storage device 1130 may be implemented as a non-volatile memory.

The communication interface 1140 supports wireless communication of the computing device.

The bus 1150 provides communication functions between components of the computing device. The bus 1150 may be implemented as various types of buses, such as an address bus, a data bus, and a control bus.

The computer program may include instructions that causes the processor 1110 to execute the block agreement method when loaded into the memory 1120. That is, the processor 1110 may perform operations for the block agreement method by executing the instructions.

The above-described block agreement method according to various embodiments may be implemented as a computer-readable computer program on a computer-readable medium. In some embodiments, the computer-readable medium may include a removable recording medium or a fixed recording medium. In some embodiments, the computer-readable program recorded on the computer-readable medium may be transmitted to another computing device via a network such as the Internet and installed in another computing device, so that the computer program can be executed by another computing device.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A block consensus method of a computing node, comprising: receiving a delegate request message including transaction hashes from each of a plurality of nodes; generating a prepared block including transaction hashes based on the delegate request message; transmitting a prepare message including the prepared block to the nodes; receiving a commit message including a proof of consensus on a validity of the prepared block from the nodes; and transmitting a reply message including a final block decided based on the commit message, wherein the delegate request message, the prepare message, and the commit message do not include original transaction corresponding to the transaction hashes, and wherein the reply message includes information which indicates at least one committee node, and the at least one committee node submits the original transaction and transmits a transaction hash of the original transaction.

2. The method of claim 1, wherein the transaction hashes included in the delegate request message received from each of the nodes includes a transaction hash of a transaction that a corresponding node wants to append to the prepared block.

3. The method of claim 1, wherein generating the prepared block includes generating the prepared block including the transaction hashes consented by a predetermined number of nodes among the nodes based on the transaction hashes included in the delegate request message.

4. The method of claim 3, wherein when a number of the nodes is (2f+1), the predetermined number is (f+1).

5. The method of claim 1, further comprising: selecting a node to request the original transaction from the at least one committee node; and requesting the original transaction from the selected node.

6. The method of claim 5, wherein selecting the node further includes calculating a number of transactions owned by the at least one committee node, and wherein selecting the node includes selecting the node sequentially from the at least one committee node based on ascending order of the number of transactions.

7. A computing device comprising: a memory configured to store one or more instructions; and a processor configured to, by executing the one or more instructions: receive a delegate request message including transaction hashes from each of a plurality of nodes; generate a prepared block including transaction hashes based on the delegate request message; transmit a prepare message including the prepared block to the nodes; receive a commit message including a proof of consensus on a validity of the prepared block from the nodes; and transmit a reply message including a final block decided based on the commit message, wherein the delegate request message, the prepare message, and the commit message do not include original transaction corresponding to the transaction hashes, and wherein the reply message includes information which indicates at least one committee node, and the at least one committee node submits the original transaction and transmits a transaction hash of the original transaction.

\* \* \* \* \*